United States Patent
Liang et al.

(10) Patent No.: US 8,761,763 B2
(45) Date of Patent: Jun. 24, 2014

(54) IMPLEMENTING METHOD AND SYSTEM FOR TERMINAL COMMUNICATIONS, AND IMPLEMENTING METHOD FOR TERMINAL LOCATION UPDATE

(75) Inventors: Xiguang Liang, Shenzhen (CN); Dejuan Feng, Shenzhen (CN); Guohe Liang, Shenzhen (CN); Aifang Sun, Shenzhen (CN)

(73) Assignee: ZTE Corporation (CN)

( * ) Notice: Subject to any disclaimer, the term of this patent is extended or adjusted under 35 U.S.C. 154(b) by 72 days.

(21) Appl. No.: 13/521,243

(22) PCT Filed: Feb. 22, 2011

(86) PCT No.: PCT/CN2011/071162
§ 371 (c)(1),
(2), (4) Date: Jul. 10, 2012

(87) PCT Pub. No.: WO2011/153846
PCT Pub. Date: Dec. 15, 2011

(65) Prior Publication Data
US 2013/0005334 A1     Jan. 3, 2013

(30) Foreign Application Priority Data
Jun. 7, 2010 (CN) .......................... 2010 1 0202408

(51) Int. Cl.
*H04W 4/14* (2009.01)
*H04W 8/06* (2009.01)

(52) U.S. Cl.
USPC ......... 455/432.3; 455/518; 455/519; 455/565

(58) Field of Classification Search
USPC ........ 455/410–411, 414.1–414.3, 417, 422.1, 455/432.1–433, 435.1–435.3, 445
See application file for complete search history.

(56) References Cited

U.S. PATENT DOCUMENTS

| | | | |
|---|---|---|---|
| 6,680,935 B1 | 1/2004 | Kung et al. | |
| 7,496,372 B1 * | 2/2009 | Haapala et al. | 455/518 |
| 2006/0240822 A1 * | 10/2006 | Jiang | 455/433 |
| 2009/0170528 A1 * | 7/2009 | Bull et al. | 455/456.2 |

FOREIGN PATENT DOCUMENTS

| | | |
|---|---|---|
| CN | 1852095 A | 10/2006 |
| CN | 1929492 A | 3/2007 |
| CN | 101217823 A | 7/2008 |
| EP | 0153662 A1 | 9/1985 |
| JP | 2003281097 A | 10/2003 |
| WO | 9849845 A1 | 11/1998 |

OTHER PUBLICATIONS

PCT International Search Report Dated Jun. 2, 2011, Applicant ZTE Corporation et al., Application No. PCT/CN2011/071162, 4 Pages.
European Search Report Dated Dec. 26, 2013, Application No. 11791838.3-1857 / 2509350 PCT/CN2011071162, Applicant ZTE Corporation, 10 Pages.

* cited by examiner

*Primary Examiner* — Kashif Siddiqui
(74) *Attorney, Agent, or Firm* — Brooks Kushman P.C.

(57) ABSTRACT

An implementing method and system for terminal communication are disclosed, the method includes: a first visitor location register judging, according to an identifier of a first terminal which initiates a communication, whether the first terminal has registered first real name system information in a network, wherein, the first visitor location register is the location register which is currently visited by the first terminal, the communication is initiated by the first terminal to a second terminal, the first real name system information includes the identifier of the first terminal and subscriber identity information of the first terminal, and the subscriber identity information corresponds to the identifier of the first terminal; and in a case when the first visitor location register determines that the first terminal has not registered the first real name system information in the network, terminating the communication initiated by the first terminal.

15 Claims, 6 Drawing Sheets

IMPLEMENTING METHOD AND SYSTEM FOR TERMINAL COMMUNICATIONS, AND IMPLEMENTING METHOD FOR TERMINAL LOCATION UPDATE

CROSS-REFERENCE TO RELATED APPLICATIONS

This application is a U.S. national phase of PCT Application No. PCT/CN2011/071162 filed Feb. 22, 2011, which claims priority to Chinese Application No. 201010202408.9 filed Jun. 7, 2010, the disclosures of which are incorporated in their entirety by reference herein.

TECHNICAL FIELD

The present invention relates to the communication technology based on terminal real name system, and in particular, to an implementing method and system for terminal communication, and an implementing method for updating terminal location.

BACKGROUND ART

With the promotion of mobile communication service and development of telecommunication technology, the number of subscribers of terminals (for example, mobile phones) is very large, and the various communication services provided by the terminal can provide big convenience for communication and information sharing between terminal subscribers.

Although the powerful communication function of the terminal can provide life convenience for the subscribers, some illegal and ill contents are also disseminated between terminals widely, which will affect the subscriber experience and increase the burden of the network.

In order to avoid dissemination of various ill informations, it needs to search for the source of the information. However, since the current terminal application is not based on real name system, a terminal can send short messages and call at will as long as the terminal performs network access registration. In order to inhibit dissemination of ill and illegal information, the measure commonly used at present is to determine the number of the terminal and locate the terminal, and also to filter the contents of the communication.

However, the above measure fails to efficiently eliminate the source of the information dissemination. The current technology can only filter the information transmitted in a short message, but cannot manage or control the contents of a call; moreover, when the contents of the short message are filtered, usually the key word that needs to be filtered is matched with the contents, but a subscriber sending a short message can readily modify the content of the short message so as to evade the filtering condition, thereby invalidating the filtering condition. In addition, based on the current technology and network architecture, although the identifier and location of the terminal disseminating illegal and ill information can be found out, the information of the subscriber operating the terminal cannot be acquired, therefore, the source of the illegal and ill information cannot be found out veritably.

In addition to the above problem, since the current terminals have not been registered with real name, many problems that are not convenient for terminal management will be caused, and for these problems, no efficient solution has been proposed yet.

SUMMARY OF THE INVENTION

With regard to the problem in the relevant technology that the terminals do not register in real name and thus the terminals cannot be managed efficiently, the present invention provides an implementing method and system for terminal communication, and an implementing method for terminal location update, which can prevent the terminals that have not registered with real name system information from communicating, and purify the network environment efficiently.

The technical solution of the present invention is carried out as follows.

The present invention provides an implementing method for terminal communication, which is used for realizing communication between terminals based on a terminal real name system.

The method comprises the following steps of: a first visitor location register judging, according to an identifier of a first terminal which initiates a communication, whether the first terminal has registered first real name system information in a network, wherein, the first visitor location register is a location register which is currently visited by the first terminal, the communication is initiated by the first terminal to a second terminal, the first real name system information comprises the identifier of the first terminal and subscriber identity information of the first terminal, and the subscriber identity information corresponds to the identifier of the first terminal; in a case when the first visitor location register determines that the first terminal has not registered the first real name system information in the network, terminating the communication initiated by the first terminal.

Wherein, in a case when the first visitor location register determines that the first terminal has registered the first real name system information, the method further comprises: a second home location register to which the second terminal belongs judging, according to an identifier of the second terminal, whether the second terminal has registered second real name system information in the network, and allowing, when a judging result is "yes", the second terminal to accept the communication initiated by the first terminal, otherwise, prohibiting the second terminal from accepting the communication initiated by the first terminal, wherein the second real name system information comprises the identifier of the second terminal and subscriber identity information of the second terminal.

The method may further comprise: when the first terminal performs location update in advance, the first visitor location register and a first home location register storing the identifier of the first terminal and first confirmation information, wherein the first home location register is the location register to which the first terminal belongs, and the first confirmation information is used to indicate whether the first terminal has registered the first real name system information in the network.

The operation of the first terminal performing location update comprises: the first terminal sending a location update request to a first mobile switching center, wherein, the first terminal belongs to the first mobile switching center; the first mobile switching center informing the first home location register of the identifier of the first terminal and location information of the first terminal via the first visitor location register; the first home location register informing a designated network element of the identifier of the first terminal, wherein, the designated network element is used to store real name system information registered by a terminal and a corresponding identifier of the terminal; the first home location register receiving and storing the first confirmation information returned by the designated network element, and sending the first confirmation information to the first visitor location register.

The method may further comprise: when the second terminal performs location update in advance, a second visitor location register that is currently visited by the second terminal and the second home location register storing the identifier of the second terminal and second confirmation information, wherein the second confirmation information is used to indicate whether the second terminal has registered the second real name system information in the network.

In addition, the operation of the second terminal performing location update comprises: the second terminal sending a location update request to a second mobile switching center, wherein, the second terminal belongs to the second mobile switching center; the second mobile switching center informing the second home location register of the identifier of the second terminal and location information of the second terminal via the second visitor location register; the second home location register informing a designated network element of the identifier of the second terminal, wherein, the designated network element is used to store real name system information registered by a terminal and corresponding identifier of the terminal; the second home location register receiving and storing the second confirmation information returned by the designated network element, and sending the second confirmation information to the second visitor location register.

In addition, in a case when the communication initiated by the first terminal is a short-message communication, the step of the first terminal initiating the communication comprises: the first terminal sending a short message to the first mobile switching center, the first mobile switching center informing the first visitor location register of the identifier of the first terminal, and the first terminal belonging to the first mobile switching center.

Moreover, in a case when the first visitor location register does not terminate the communication initiated by the first terminal, the method further comprises: the first mobile switching center performing number analysis on an address of a short message center in the short message, finding an access mobile switching center of the short message center, sending the short message to the access mobile switching center, and the access mobile switching center forwarding the short message to the short message center; a short message verifying center verifying the short message received by the short message center, and in a case when the short message passes the verification, the short message center caching the verified short message in the short message center; the short message center forwarding the verified short message to the access mobile switching center, and the access mobile switching center finding out the second mobile switching center through the second home location register and forwarding the short message to the second mobile switching center, and then the second mobile switching center forwarding the short message to the second terminal, wherein, the second terminal belongs to the second mobile switching center.

Furthermore, before the step of the access mobile switching center sending the short message to the second mobile switching center, the method further comprises: the access mobile switching center informing the second home location register of the identifier of the second terminal; the second home location register judging whether the second terminal has registered the second real name system information, and in a case where the judging result is "yes", allowing the access mobile switching center to send the short message to the second terminal via the second mobile switching center. According to another aspect of the present invention, the present invention further provides an implementing method for terminal communication, which is used for realizing communication between terminals based on a terminal real name system.

The implementing method for terminal communication according to the present invention comprises: in a case when a first terminal initiates a communication to a second terminal, a second home location register to which the second terminal belongs judging, according to an identifier of the second terminal, whether the second terminal has registered second real name system information in a network, wherein, the second real name system information comprises the identifier of the second terminal and subscriber identity information of the second terminal, and the subscriber identity information corresponds to the identifier of the second terminal; if the second terminal has not registered the second real name system information, prohibiting the second terminal from accepting the communication initiated by the first terminal.

The method may further comprise: when the second terminal performs location update in advance, a second visitor location register that is currently visited by the second terminal and the second home location register storing the identifier of the second terminal and second confirmation information, wherein the second confirmation information is used to indicate whether the second terminal has registered the second real name system information in the network.

Wherein, the second terminal performing location update comprises: the second terminal sending a location update request to a second mobile switching center, wherein, the second terminal belongs to the second mobile switching center; the second mobile switching center informing the second home location register of the identifier of the second terminal and location information of the second terminal via the second visitor location register; the second home location register informing a designated network element of the identifier of the second terminal, wherein, the designated network element is used to store real name system information registered by a terminal and a corresponding identifier of the terminal; the second home location register receiving and storing the second confirmation information returned by the designated network element, and sending the second confirmation information to the second visitor location register.

The present invention further provides an implementing system for terminal communication, which is used for realizing communication between terminals based on a terminal real name system.

The system comprises a first visitor location register, wherein the first visitor location register comprises:
a first judging module, which is used judge, according to an identifier of a first terminal which initiates a communication, whether the first terminal has registered first real name system information in a network, wherein, the first visitor location register is a location register which is currently visited by the first terminal, the communication is initiated by the first terminal to a second terminal, the first real name system information includes the identifier of the first terminal and subscriber identity information of the first terminal, and the subscriber identity information corresponds to the identifier of the first terminal; a first processing module, which is used to, in a case when the first judging module determines that the first terminal has not registered the first real name system information in the network, terminate the communication initiated by the first terminal.

The system further comprises a second home location register, which comprises: a second judging module, which is used to, in a case when the first processing module does not terminate the communication initiated by the first terminal, judge whether the second terminal has registered second real name system information in the network according to an identifier of the second terminal, wherein, the second real name system information comprises the identifier of the second terminal and subscriber identity information of the second terminal; a second processing module, which is used to allow the second terminal to accept the communication initiated by the first terminal in a case when a judging result of the second judging module is "yes"; and to prohibit the second terminal from accepting the communication initiated by the first terminal in a case when the judging result of the second judging module is "no".

In the present invention, whether the terminal has registered real name system information is judged, and the terminal that has registered real name system information is allowed to communicate, which can efficiently prevent the terminal that has not registered real name system information from communicating, and the information of the subscriber can be determined definitely even if the terminal disseminates illegal or ill contents, which helps to trace the information resource and destination of the communication, thus effectively purifying the network environment, facilitating high management and monitoring of the network, and avoiding unnecessary network overhead.

SPECIFIC EMBODIMENTS

With regard to the problem in the relevant technology that terminals can not be efficiently managed as the terminals do not register real name, the present invention proposes that whether the terminal has registered real name system information is judged, and the terminal that has registered real name system information is allowed to communicate, which can achieve efficient management of the communication of terminals based on the real name system and purify the communication environment.

The technical solution of the present invention will be described in detail below with reference to the drawings.

According to an example of the present invention, an implementation method for terminal communication is provided. This method is used to realize communication between terminals based on the terminal real name system.

Before the operator opens various services for the terminal subscriber or when the terminal accesses the network, an operator of a trusted supervision department will acquire the identity information of the subscriber, and send the subscriber identity information and the identifier of the terminal to a trusted institution (e.g., police network), which will verify the identity of the subscriber, and after the verification is passed, the network will store the real name system information (including the identifier of the terminal and the identity information of the mobile subscriber) registered by the subscriber. Preferably, the identity information of the subscriber, when the subscriber registers the real name system information at the trusted institution in advance, can be bound with the terminal identifier (for example, the number (which may be the number of the smart card on the terminal) of the terminal) and stored into the network together. The subscriber identity information may be license (for example I.D. card) number of the subscriber, physiological information (for example, fingerprint information, photo, iris information, etc.) or combination thereof, and may also comprise, when necessary, self-defined information entered by the subscriber who has a valid identity.

Figure 1:
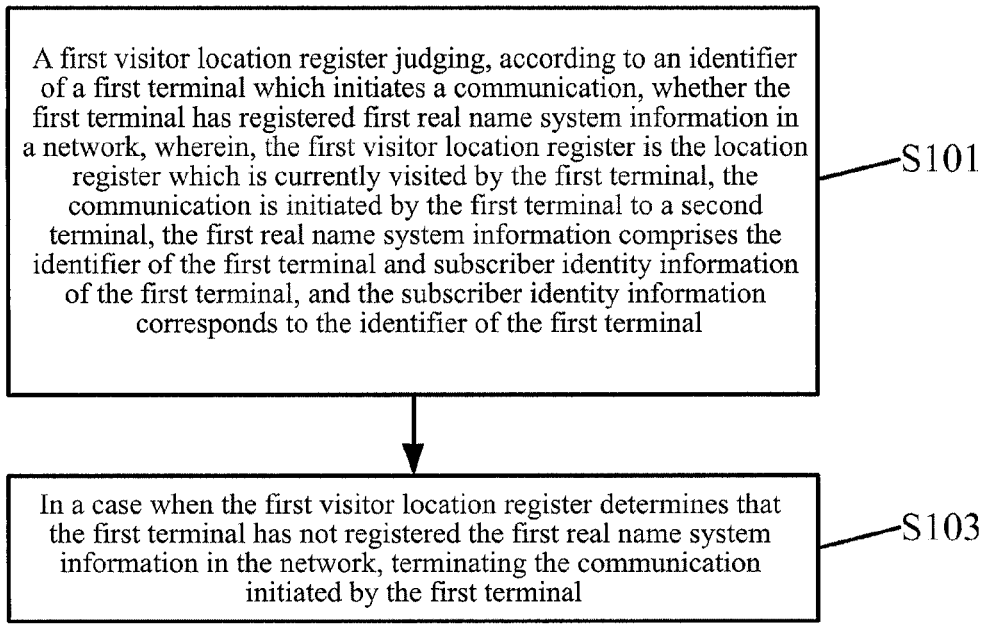
FIG. 1 is a flowchart of an implementing method for terminal communication according to an example of the present invention.

FIG. 1 is a flowchart of an implementing method for terminal communication according to an example of the present invention. As shown in FIG. 1, the method comprises the following steps.

Step S101, a first visitor location register judging, according to an identifier of a first terminal which initiates a communication, whether the first terminal has registered first real name system information in a network, wherein, the first visitor location register is the location register which is currently visited by the first terminal, the communication is initiated by the first terminal to a second terminal, the first real name system information comprises the identifier (which may be, for example, the identifier of the smart card on the terminal, for example, the mobile phone number of the subscriber) of the first terminal and subscriber identity information of the first terminal, and the subscriber identity information corresponds to the identifier of the first terminal.

Step S103, in a case when the first visitor location register determines that the first terminal has not registered the first real name system information in the network, the first visitor location register terminates the communication initiated by the first terminal; while if the first terminal has registered the first real name system information in the network, the first visitor location register proceeds with the communication initiated by the first terminal.

Through the above processing, the terminal that has not registered real name system information can be prevented from communicating efficiently, and the information of the subscriber can be determined definitely even if the terminal disseminates illegal and ill contents, which helps to trace the information resource and destination of the communication, thus effectively purifying the network environment, facilitating high management and monitoring of the network, and avoiding unnecessary network overhead.

Figure 2:
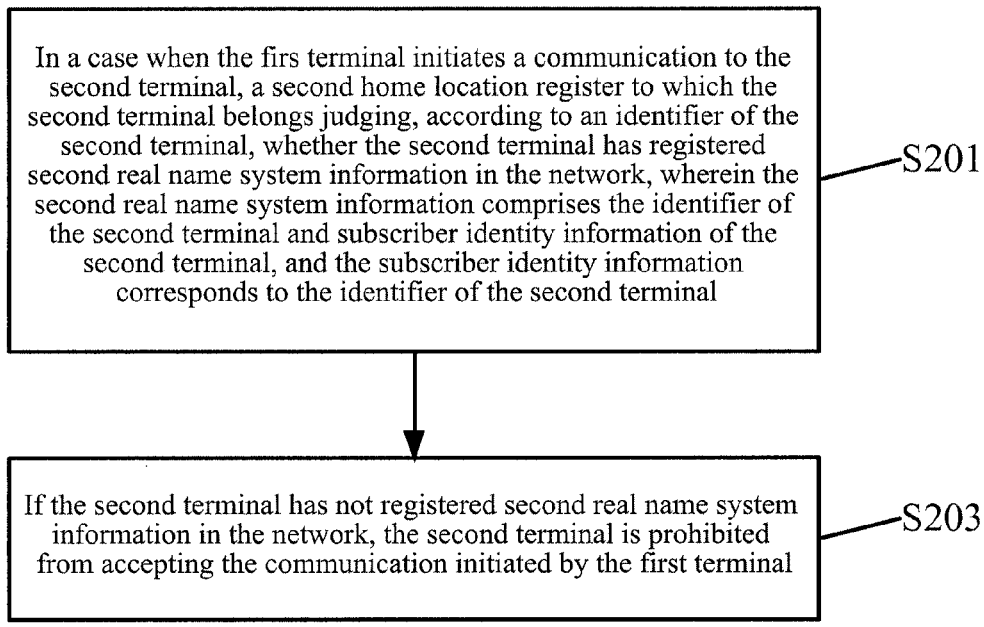
FIG. 2 is a flowchart of another implementing method for terminal communication according to an example of the present invention.

In addition, as for the target of the communication, i.e., the second terminal, the similar judging process can also be adopted, as shown in FIG. 2, which specifically comprises the following steps.

Step S201, in a case when the first terminal initiates a communication to the second terminal, a second home location register to which the second terminal belongs judging, according to an identifier of the second terminal, whether the second terminal has registered second real name system information in the network, wherein the second real name system information comprises the identifier of the second terminal and subscriber identity information of the second terminal, and the subscriber identity information corresponds to the identifier of the second terminal.

Step S203, if the second terminal has not registered second real name system information in the network, the second terminal is prohibited from accepting the communication initiated by the first terminal.

Through the judging process implemented on the second terminal, the terminal that has not registered real name system information can be prevented from communicating with the terminal initiating the communication efficiently, thereby achieving real name system management on the communication at the network side of the receiving party.

Optionally, the processing in FIG. 1 and in FIG. 2 can be implemented separately, or in sequence. Such, after judging is performed on whether the terminal initiating the communication (the first terminal) has registered real name system information, whether the second terminal has registered real name system information may be further judged.

Specifically, the process of judging whether the second terminal has registered real name system information is as follows: in a case when the first visitor location register determines that the first terminal has registered the first real name system information (that is, in a case when the first visitor location register does not terminate the communication between the first terminal and the second terminal), before the first terminal communicates with the second terminal, the first mobile switching center, a gateway mobile switching center (GMSC), or other related communication network elements inform the second home location register of the identifier of the second terminal, wherein, the second terminal belongs to the second home location register; similarly, the second home location register can judge, according to an identifier of the second terminal, whether the second terminal has registered second real name system information in the network, and allow, when the judging result is "yes", the second terminal to accept the communication initiated by the first terminal, otherwise, prohibit the second terminal from accepting the communication initiated by the first terminal, wherein the second real name system information comprises the identifier of the second terminal and subscriber identity information of the second terminal.

Wherein, depending on different services practically implemented by the terminal, the second home location register is informed of the identifier of the second terminal by different network elements. For example, in a short message or a multimedia message communication, the identifier of the second terminal is sent to the second home location register by an access mobile switching center; while in a voice communication, the identifier of the second terminal is sent to the second home location register by a first mobile switching center or a gateway mobile switching center. The specific sending manners may be the commonly used manners in the prior art, and will not be listed here.

Wherein, in the above processing, when the second terminal is prohibited from accepting the communication initiated by the first terminal, many modes can be adopted. For example, the second home location register may reject to forward related information required by the communication, or the second home location register may inform other related network element so as to prohibit it from forwarding related information required by the communication. Moreover, the process of the first visitor location register terminating initiation of communication can also adopt the similar mode.

In addition, the second home location register or other related network elements may also send to the first terminal and/or the second terminal the reasons that the communication cannot be carried out.

By using the judging process of the first terminal and that of the second terminal in combination, the terminal that has not registered real name system information can be efficiently prevented from communicating with the terminal initiating the communication, and the enhancement of the real name system management can be further improved.

Figure 3:
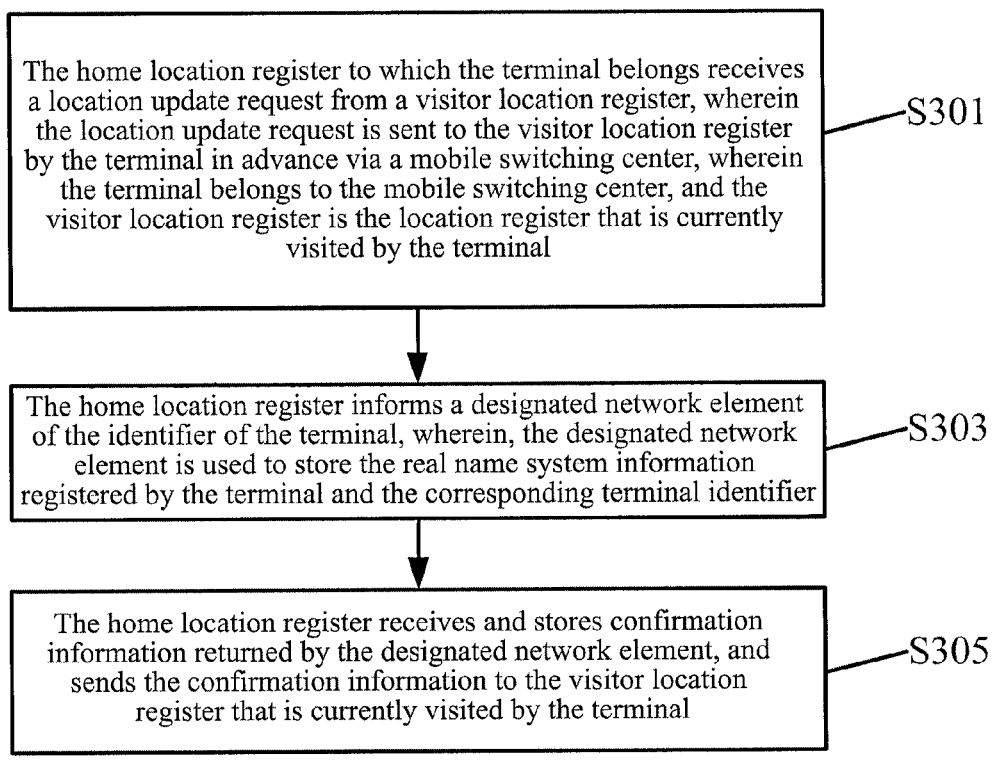
FIG. 3 is a flowchart of a visitor location register obtaining the real name system information registration situation of the terminal when the location of the terminal is updated according to an example of the present invention.

FIG. 3 is a flowchart of a visitor location register obtaining the real name system information registration situation of the terminal when the location of the terminal is updated, which, as shown in FIG. 3, comprises the following steps.

In Step S301, the home location register to which the terminal belongs receives a location update request from a visitor location register, wherein the location update request is sent to the visitor location register by the terminal in advance via a mobile switching center, wherein the terminal belongs to the mobile switching center, and the visitor location register is the location register that is currently visited by the terminal.

In step S303, the home location register informs a designated network element of the identifier of the terminal, wherein, the designated network element is used to store the real name system information registered by the terminal and the corresponding terminal identifier.

In step S305, the home location register receives and stores confirmation information returned by the designated network element, and sends the confirmation information to the visitor location register that is currently visited by the terminal. The confirmation information is used to indicate whether the terminal has registered the real name system information in the network; optionally, when the terminal has registered the real name system information in the network, the confirmation information further comprises the real name system information.

By the processing as shown in FIG. 3, the home location register and visitor location register of the terminal can be informed of the information related with the real name system registration situation of the subscriber terminal, so as to make judgment on whether the terminal has implemented real name system registration during the subsequent process of service implementation.

Through the flow as shown in FIG. 3, when the first terminal performs location update in advance, the first visitor location register and the first home location register store the identifier of the first terminal and first confirmation information, wherein the first home location register is the location register to which the first terminal belongs, and the first confirmation information is used to indicate whether the first terminal has registered the first real name system information in the network.

Referring to the processing as shown in FIG. 3, the process of the first visitor location register obtaining the real name system information registration situation of the first terminal specifically comprises: the first terminal sending a location update request to a first mobile switching center, wherein, the first terminal belongs to the first mobile switching center; the first mobile switching center informing the first home location register of the identifier of the first terminal and location information of the first terminal via the first visitor location register; the first home location register informing a designated network element of the identifier of the first terminal, wherein, the designated network element is used to store the real name system information registered by the terminal and the corresponding terminal identifier; the first home location register receiving and storing the first confirmation information returned by the designated network element, and sending the first confirmation information to the first visitor location register.

Similarly, when the second terminal performs location update in advance, the second visitor location register that is currently visited by the second terminal and the second home location register store the identifier of the second terminal and the second confirmation information, wherein the second confirmation information is used to indicate whether the second terminal has registered the second real name system information in the network.

Moreover, referring to the processing as shown in FIG. 3, the process of the second visitor location register obtaining the real name system information registration situation of the second terminal specifically comprises: the second terminal sending a location update request to the second mobile switching center, wherein, the second terminal belongs to the second mobile switching center; the second mobile switching center informs the second home location register of the identifier of the second terminal and location information of the second terminal via the second visitor location register; the second home location register informs a designated network element of the identifier of the second terminal, wherein, the designated network element is used to store the real name system information registered by the terminal and the corresponding identifier of the terminal; the second home location register receives and stores the second confirmation information returned by the designated network element, and sends the second confirmation information to the second visitor location register.

Wherein, the above designated network element may be a separate network entity in the network, or may be disposed in combination with the existing network element.

Through the present invention, a Home Location Register (HLR) can accept and store the confirmation information or real name system information of the subscriber in real time, and send the confirmation information or real name system information of the related subscriber to a Visitor Location Register (VLR) of the subscriber through a location update operation. Thus, when a Mobile Switching Center (MSC) inquiries the VLR or HLR of the authority or routing information of a certain communication service, the VLR or HLR can determine whether to allow the communication service or to provide routing information for this communication service according to the stored confirmation information or subscriber real name system information. If the communication service cannot be provided just because the subscriber has not implemented real name system registration, the terminal (MS, which may be a mobile phone) will inform the subscriber.

Figure 4:
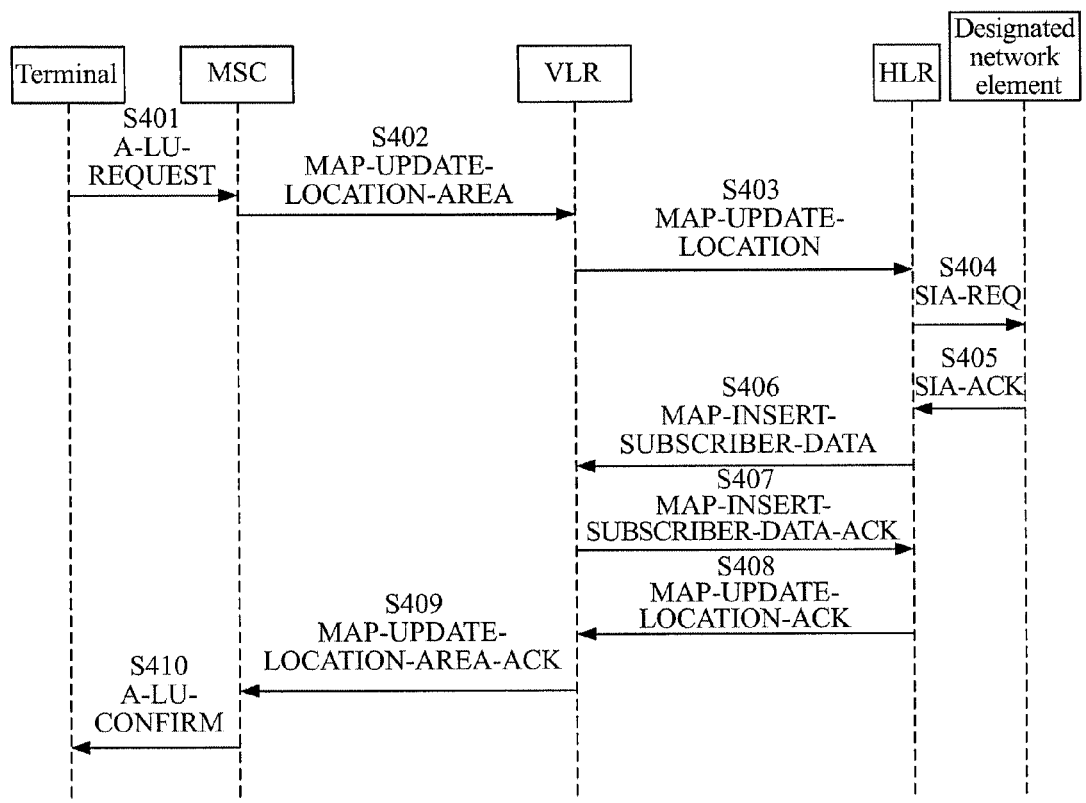
FIG. 4 is a signaling flowchart of terminal location update processing according to an example of the present invention.

FIG. 4 shows a processing procedure of a terminal implementing location update. As shown in FIG. 4, when a terminal implements location update, the following processing procedure is specifically included.

In Step S401, a terminal sends an air location update request (A-LU-REQUEST) to its serving MSC to request for location update, wherein the request carries the identifier of the terminal (for example, the subscriber identity module (SIM) card number of the terminal, the International Mobile Subscriber Identification Number (IMSI) on the SIM card, the Temporary Mobile Subscriber Identity (TMSI), etc.).

In step S402, the serving MSC sends a mobile application part (MAP) update location area (MAP-UPDATE-LOCATION-AREA) request to the VLR, wherein the request carries the current location information of the terminal, for example the target location area identity (Target location area Id), serving cell identity (Serving cell Id); and the identifier of the terminal, for example the SIM card number, IMSI, TMSI and so on.

In step S403, the VLR sends a MAP update location (MAP-UPDATE-LOCATION) request to the HLR of the terminal to request the HLR to update the location information of the terminal, wherein the request carries the SIM card number of the terminal and the current location information of the MS.

In step S404, the HLR sends a subscriber information auditing request (SIA-REQ) to a designated network element so as to request for obtaining the real name system registration situation of the subscriber from the designated network element, wherein the request carries the SIM card number of the terminal.

In step S405, the designated network element judges, according its stored real name system registration information, whether the subscriber has performed real name system registration. Generally, the SIM card number entered by the subscriber when performing real name system registration and the identity information entered by the subscriber will be stored in the real name system registration information, and if the designated network element stores the recording corresponding to the SIM card number carried in the SIA-REQ request, it is considered that the subscriber has performed real name system registration, and if the designated network element stores the recording corresponding to the SIM card number carried in the SIA-REQ request, it is considered that subscriber has not performed real name system registration; afterwards, the designated network element carries the situation about whether the subscriber has performed real name system registration in a subscriber information auditing acknowledgement (SIA-ACK), of which the HLR is informed.

In step S406, the HLR stores the real name system registration situation of the subscriber, and carries the situation about whether the subscriber has performed real name system registration in MAP insert subscriber data (MAP-INSERT-SUBSCRIBER-DATA) to return to the VLR.

In step S407, the VLR stores the real name system registration situation of the subscriber, and returns a MAP insert subscriber data acknowledgement (MAP-INSERT-SUBSCRIBER-DATA-ACK) to the HLR to confirm that the VLR has received the MAP-INSERT-SUBSCRIBER-DATA.

In step S408, the HLR returns a MAP update location acknowledgement (MAP-UPDATE-LOCATION-ACK) to the VLR to indicate that the HLR has updated the location of the terminal.

In step S409, the VLR carries the situation about whether the subscriber has performed real name system registration in a MAP update location area acknowledgement (MAP-UPDATE-LOCATION-AREA-ACK) to be returned to the serving MSC.

In step S410, the serving MSC carries the situation about whether the subscriber has performed real name system registration in an air location update confirmation (A-LU-CONFIRM) to be returned to the terminal.

Different from the prior art, after the HLR (the home location register to which the terminal belongs) receives the location update request of the VLR (the visitor location register that is currently visited by the terminal), the HLR firstly requests for obtaining the real name system registration situation of the subscriber from the designated network element through the message SIA-REQ, and returns the confirmation information returned by the designated network element to the VLR via the MAP-INSERT-SUBSCRIBER-DATA, and then the VLR sends the confirmation information to the MSC (i.e., the above mobile switching center) to which the terminal belongs, and the MSC finally returns the location update result to the terminal. In this way, the terminal of the subscriber, the HLR and VLR all store the real name registration situation of the subscriber.

The service management process based on real name system according to the example of the present invention will be described in detail below.

In a case when the communication initiated by the first terminal is a short-message communication, when initiating the communication, the first terminal informs the first visitor location register of the identifier of the first terminal via the first mobile switching center (which is the mobile switching center providing services for the first terminal), and sends the short message to the first mobile switching center, wherein, the first terminal belongs to the first mobile switching center. In this way, the first visitor location register can judge whether the first terminal has registered the first real name system information, and thereby determine whether to allow the first terminal to communicate with the second terminal.

After the first visitor location register determines to allow the first terminal to communicate with the second terminal, the first mobile switching center finds an access mobile switching center of the short message service based on number analysis on the address of a short message center, and sends the short message to this access mobile switching center, and the access mobile switching center forwards the short message to the short message center.

Preferably, after the short message center receives the short message, a short message verifying center may verify the short message received by the short message center, and proceeds with the remaining sending operation for the short message only in a case when the short message passes the verification. If the verification is not passed, the short message center will terminate this short message communication on the ground that the content violates the rules.

In a case when the short message passes the verification, the short message center firstly caches the short message passing the verification in a database of the short message center, and if the condition of forwarding the short message is met, short message forwarding processing is started, wherein the condition of forwarding the short message is the same with the forwarding condition in the prior art and thus will not be repeated.

The subsequent short message forwarding processing starts with forwarding the short message to the access mobile switching center by the short message center, and upon receiving the request for forwarding the short message, the access mobile switching center inquires the second home location register of the routing information currently reaching the second terminal. The second home location register informs the access mobile switching center of the address of the second mobile switching center so that the access mobile switching center can send the short message to the second terminal via the second mobile switching center, wherein, the second terminal belongs to the second mobile switching center. Wherein, when the short message verifying center verifies the short message, the illegal characters in the short message can be deleted, and the remaining characters are allowed to be sent. If there are too many deleted characters, the short message may be prohibited from being sent, i.e., the short message does not pass the verification. If it is determined that the situation that the short message violates the rules is severe, it can be directly reported to the police office so that corresponding measures can be taken.

It is assumed that the terminal sending the short message is the first terminal, and the terminal receiving the short message is the second terminal, and the processing of sending a short message and that of receiving the short message will be described below with reference to FIG. 5 and FIG. 6.

Figure 5:
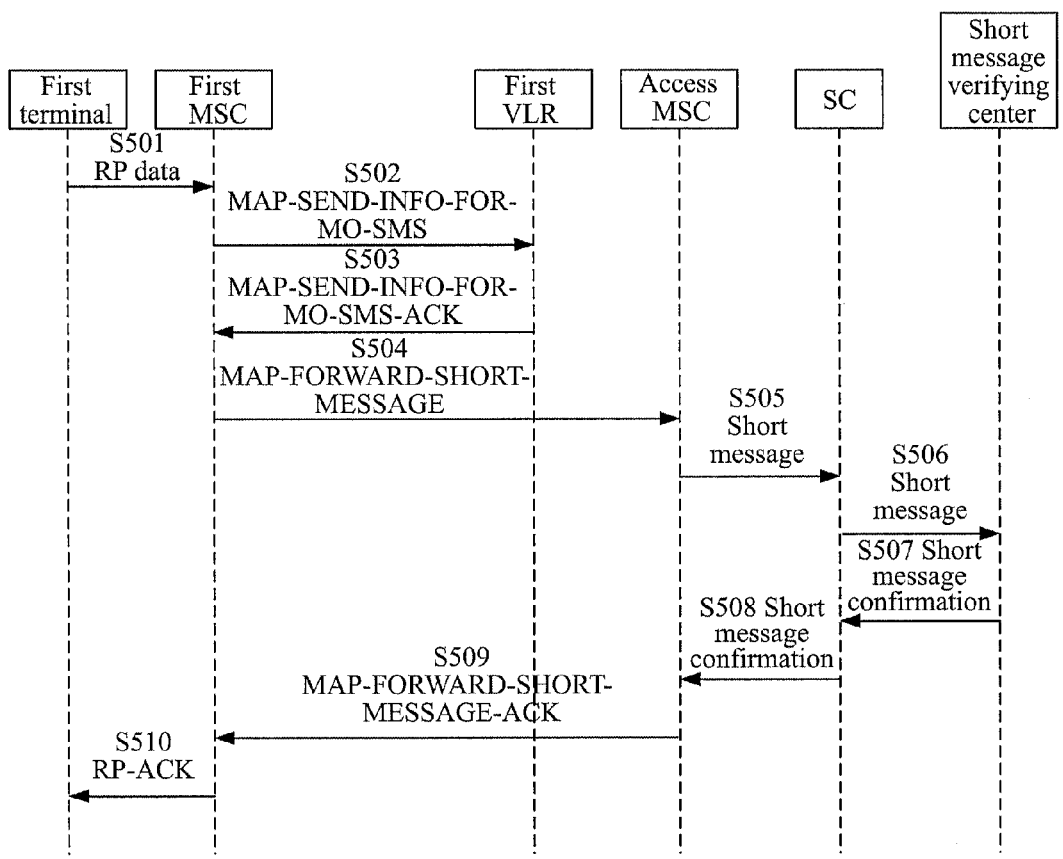
FIG. 5 is a signaling flowchart of short message transmission processing according to an example of the present invention.

FIG. 5 shows the processing process of a terminal sending a short message. As shown in FIG. 5, the following processing is included in detail.

In step S501, the terminal sending the short message (i.e., the above first terminal, referred to as MS 1 in short) initiates a short message sending flow to the terminal receiving the short message (i.e., the above second terminal, referred to as MS 2 in short). Firstly, the first terminal sends to its serving MSC (the first MSC) a relay protocol (RP) data (RP-DATA) request, which carries the SIM card number of MS 1, the SIM card number of MS 2, short message content and the identifier of the short message center (SC) (e.g., the number of the SC).

In step S502, the serving MSC of MS 1 (referred to as MSC 1 in short) sends to the first VLR of MS 1 (referred to as VLR 1) a MAP sending information for mobile originated short message (MAP-SEND-INFO-FOR-MO-SMS) request, which carries the SIM card number of MS 1.

In step S503, the VLR 1 firstly judges, according to the SIM card number of MS 1, whether the subscriber has performed real name system registration, and if yes, then the VLR 1 proceeds to implement the remaining short message processing flow; if not, then the VLR 1 rejects to provide corresponding routing information for this short message on the ground that the subscriber has not performed real name system registration, thereby terminating this short message service, and returns a failure prompt like "no real name system information has been registered yet, and the short message cannot be sent" to MS 1 via a MAP sending information for mobile originated short message acknowledgement (MAP-SEND-INFO-FOR-MO-SMS-ACK).

In step S504, if the subscriber has performed real name system registration, MSC 1 will send to an access MSC a MAP forwarding short message (MAP-FORWARD-SHORT-MESSAGE) request, which carries the SIM card number of MS 1, the SIM card number of MS 2 and the content of the short message, so as to forward the short message to the access MSC.

In step S505, the access MSC forwards the SIM card number of MS 1, the SIM card number of MS 2 and the content of the short message to the SC.

In step S506, the SC forwards the SIM card number of MS 1, the SIM card number of MS 2 and the content of the short message to the SMMC.

In step S507, the short message verifying center (SMMC) checks the legality of the content of the short message, and if the short message is legal, the SMMC sends to the SC confirmation information for indicating that the short message is legal; otherwise, the SMMC returns to the a negative confirmation to indicate that the short message is illegal.

In step S508, the SC sends to the access MSC a legality examination result of the content of the short message.

In step S509, the access MSC carries the forwarding situation of the short message (succeeds or fails, if fails, it may be because the content violates the rules) in a MAP forwarding short message acknowledgement (MAP-FORWARD-SHORT-MESSAGE-ACK) to return to the MSC 1.

In step S510, the MSC 1 carries the forwarding situation of the short message in a RP acknowledgement (RP-ACK) to return to the MS.

As can be seen, the MAP-SEND-INFO-FOR-MO-SMS message sent by MSC 1 (i.e., the above first mobile switching center) carries the identifier of MS 1, and thereby VLR 1 (the visitor location register that is currently visited by the subscriber, i.e., the above first home location register) can judge, after receiving this MAP-SEND-INFO-FOR-MO-SM, whether the subscriber has registered real name system information. If the subscriber has registered real name system information, then VLR 1 proceeds to implement the remaining short message processing flow, and initiates a short message communication normally; otherwise (the first terminal has not registered real name system information), VLR 1 rejects to provide corresponding routing information for this short message on the ground that the subscriber has not performed real name system registration, thereby terminating this short message service, and returns a failure prompt like "no real name system information has been registered yet, and the short message cannot be sent" to the first terminal.

Moreover, when the access MSC sends the short message to the SC, the SC will relay the short message to the network element for filtering the content of the short message to perform content examination, thereby checking the legality of the short message. If the short message passes the legality check by the SMMC, then the sending processing of the short message will be implemented continually; otherwise, the SMMC will return a negative confirmation to the short message center to indicate that the short message is illegal; after the SC receives this negative confirmation, this short message service will be terminated, and a prompt like "the content of the message violates the rules" may be sent to the first terminal.

After the short message passes the verification of the short message verifying center, if it need not perform real name system judgment on the second terminal receiving the short message, the subsequent flow in the prior art can be adopted to implement receiving of the short message, and if it needs to perform real name system judgment on the second terminal receiving the short message, the access mobile switching center informs the second home location register of the identifier of the second terminal before sending the short message to the second mobile switching center. The second home location register judges whether the second terminal has registered the second real name system information, and allows, when the judging result is "yes", the access mobile switching center to send the short message to the second terminal via the second mobile switching center.

Figure 6:
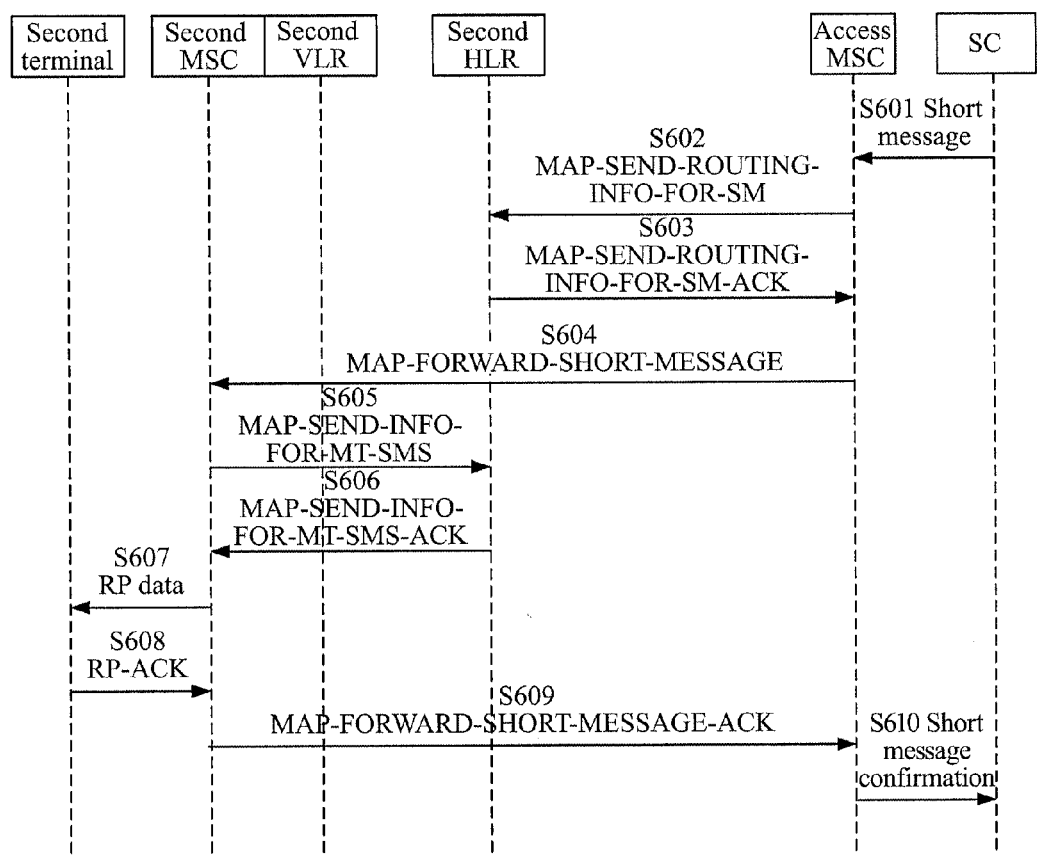
FIG. 6 is a signaling flowchart of short message reception processing according to an example of the present invention.

FIG. 6 shows the processing process of the terminal receiving the short message, which, as shown in FIG. 6, may comprise the following processing.

In step S601, the SC sends the SIM card number of MS 1, the SIM card number of MS 2, the sending time, the content of the short message and so on to the access MSC.

In step S602, the access MSC sends the SIM card number of MS 2 to the HLR (the second HLR, which is referred to as HLR 2 in short) of the terminal for receiving the short message (for example MS 2) by carrying the SIM card number of MS 2 in a MAP sending routing information for short message (MAP-SEND-ROUTING-INFO-FOR-SM).

In step S603, HLR 2 judges, according to the SIM card number of MS 2, whether the subscriber has performed real name system registration, and if yes, HLR 2 notifies the access MSC to proceed with the processing of MS 2 receiving the short message through a MAP sending routing information for short message acknowledgement (MAP-SEND-ROUTING-INFO-FOR-SM-ACK), and returns the number of the serving MSC (i.e., the above second mobile switching center, which is referred to as MSC 2) of MS 2; otherwise, HLR 2 instructs the access MSC to reject to provide routing information for this short message service through MAP-SEND-ROUTING-INFO-FOR-SM-ACK, thereby terminating this short message service.

In step S604, if MS 2 has performed real name system registration, and this short message service may be continued, the access MSC carries the content of the short message in a MAP forwarding short message (MAP-FORWARD-SHORT-MESSAGE) and sends it to the serving MSC 2 of MS 2.

In step S605, MSC 2 sends a MAP sending information for mobile terminated short message (MAP-SEND-INFO-FOR-MT-SMS) request to the VLR of MS 2 (the second VLR, which is referred to as VLR 2) to request for obtaining the MSISDN of MS 2, and the request carries the SIM card number of MS 2.

In step S606, VLR 2 initiates a paging or searching operation on MS 2 in which MSC 2 participates, finds MS 2, and returns the MSISDN of MS 2 to MSC 2 by carrying the MSISDN of MS 2 in a MAP sending formation for mobile terminated short message acknowledgement (MAP-SEND-INFO-FOR-MT-SMS-ACK).

In step S607, MSC 2 cooperates with VLR 2 and finds out MS2 through paging or searching, and sends the content of the short message to MS 2 by carrying the content of the short message in a RP-DATA.

In step S608, MS 2 carries a response result for receiving the short message in a RP-ACK and returns it to MSC 2, wherein the response result is short message receiving success or short message receiving failure.

In step S609, MSC 2 carries the response result for receiving the short message of MS 2 in a MAP forwarding short message acknowledgement (MAP-FORWARD-SHORT-MESSAGE-ACK) and returns it to the access MSC.

In step S610, the access MSC returns the response result for receiving the short message of MS 2 to the SC.

When the access MSC inquires the second HLR (the HLR to which MS 2 belongs, referred to as HLR 2 in short, i.e., the above second home location register) of routing information through a MAP-SEND-ROUTING-INFO-FOR-SM, HLR 2 judges whether the target subscriber of the short message has registered real name system information, if yes, HLR 2 continues to notify, through a MAP-SEND-ROUTING-INFO-FOR-SM-ACK, the access mobile switching center of the short message center to proceed with the processing of the second terminal receiving the short message, and this process may adopt the processing mode in the prior art; otherwise, HLR 2 instructs, through a MAP-SEND-ROUTING-INFO-FOR-SM-ACK, to reject to provide routing information for this short message service, thereby terminating this short message service.

It should be noted that although the specific processes of location update, sending/receiving a short message are provided in the above description, the present invention is not limited thereto. In practical applications, the above processing steps may vary, and network entities other than the first visitor location register and the second home location register can be used to check whether the terminal has registered real name system information, which will not listed here.

As for the flows of voice call and multimedia message transmission, a process of judging whether real name system information is registered through a HLR and a VLR can be added on the basis of the existing flow. Description will be made below by taking a voice call as example.

Figure 7:
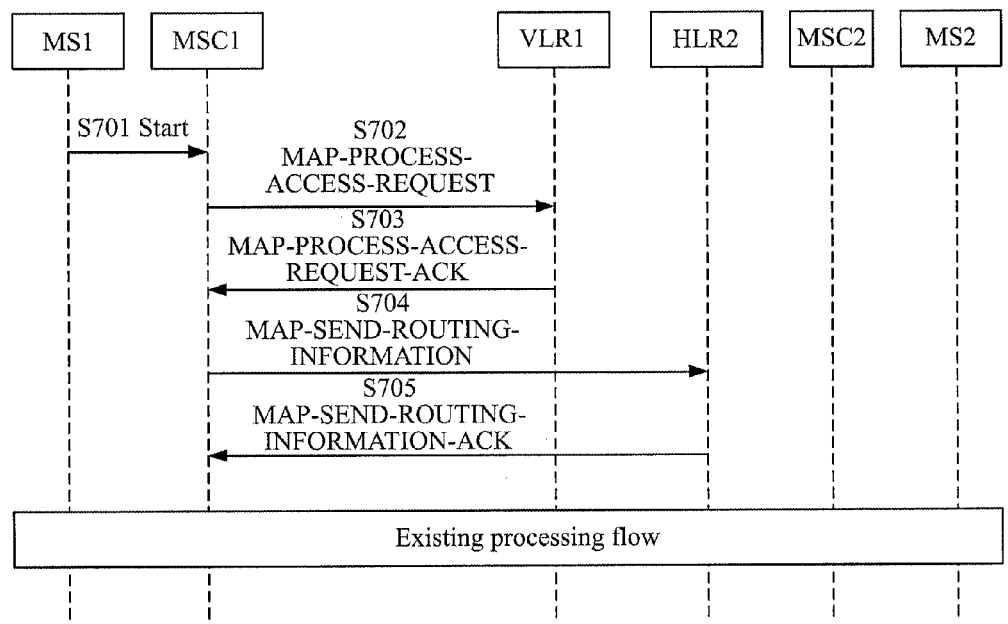
FIG. 7 is a flowchart of a simplified processing process for a mobile terminal-to-mobile terminal call according to an example of the present invention.

FIG. 7 is a flowchart of a simplified processing process for a mobile terminal-to-mobile terminal call according to an example of the present invention, which, as shown in FIG. 7, comprises the following processing in detail.

In step S701, after a calling subscriber (referred to as MS 1) establishes a corresponding MM (mobile management) connection with a serving MSC (referred to as MSC 1) of the calling subscriber, MS 1 sends a call request to MSC 1, wherein the call request carries the SIM card number of a called subscriber (referred to as MS 2).

In step S702, after receiving the call request, the MSC 1 implements the processing same as the prior art together with the visitor location register of MS 1 (referred to as VLR 1) and the home location register of MS 2 (referred to as HLR 2), for example, MSC 1 and VLR 1 implement access authentication processing. Moreover, MS 1 sends an access request to VLR 1 via MSC 1, and MSC 1 can sends the access request to VLR 1 through a MAP processing access request (MAP_PRO-CESS_ACCESS_REQUEST).

In step S703, after receiving the MAP_PROCESS_AC-CESS_REQUEST, VLR 1 firstly judges whether MS 1 has registered real name system information, and if the subscriber has registered real name system information, VLR1 continues to implement the processing same as the prior art; if the subscriber has not registered real name system information, VLR 1 rejects the access request of MS 1 through a MAP processing access request acknowledgement on the ground that the calling subscriber has not registered real name system information, and MSC 1 terminates this call after receiving the rejecting access instruction of VLR 1.

In step 704, if VLR 1 agrees to access MS 1, and MSC 1 can reach HLR 2, then MSC 1 sends to HLR 2 a MAP sending routing information (MAP_SEND_ROUTING_INFORMA-TION) request, which carries the SIM card number of MS 2, to request for the routing information for reaching MS 2.

In step S705, after receiving the MAP_SEND_ROUT-ING_ INFORMATION request, HLR 2 firstly checks whether MS 2 has registered real name system information, and if the subscriber has registered real name system information, HLR 2 continues to implement the processing same as the prior art, and searches for the routing information for reaching MSC 2 from MSC 1. If the routing information of MS 2 is found, HLR 2 sends a MAP sending routing information acknowledgement (MAP_SEND_ROUTING_IN-FORMATION_ACK) to MSC 1, thereby returning the call routing to MSC 1; if HLR 2 fails to find the routing information of MS 2, HLR 2 sends a rejection instruction to MSC 1, and MSC 1 terminates this call; if the subscriber has not registered real name system information, HLR 2 rejects to provide routing information for this call on the ground that MS 2 has not registered real name system information.

It should be pointed out that if HLR 2 is unreachable for MSC 1 (step S704) in the above process, MSC 1 forwards this call to a corresponding GMSC, and the GMSC sends the SIM card number of MS 2 to HLR 2 to request for the routing information for reaching MS 2. HLR 2, after receiving the routing request, also firstly checks whether MS 2 has registered real name system information, if yes, HLR 2 searches for the routing information from GMSC to MS 2, and if HLR 2 finds out the routing information for reaching MS 2, HLR 2 sends call routing to the GMSC, and continues to implement the processing same as the prior art; if HLR 2 fails to find the routing information of MS 2, HLR 2 sends a rejection instruction to GMSC, and GMSC terminates this call; if the subscriber has not registered real name system information, HLR 2 rejects to provide routing information for this call on the ground that MS 2 has not registered real name system information.

It should be pointed out that FIG. 7 is only an illustration of the specific implementation example of a voice call flow, and in practical applications, message interaction and logic processing of a call process will vary, and depending on different scenes, the specific implementation processes may be more complicated, and thus will not be listed or repeated here.

According to the example of the present invention, the present invention further provides an implementing system for terminal communication, which is used for realizing communication between terminals based on a terminal real name system.

Figure 8:
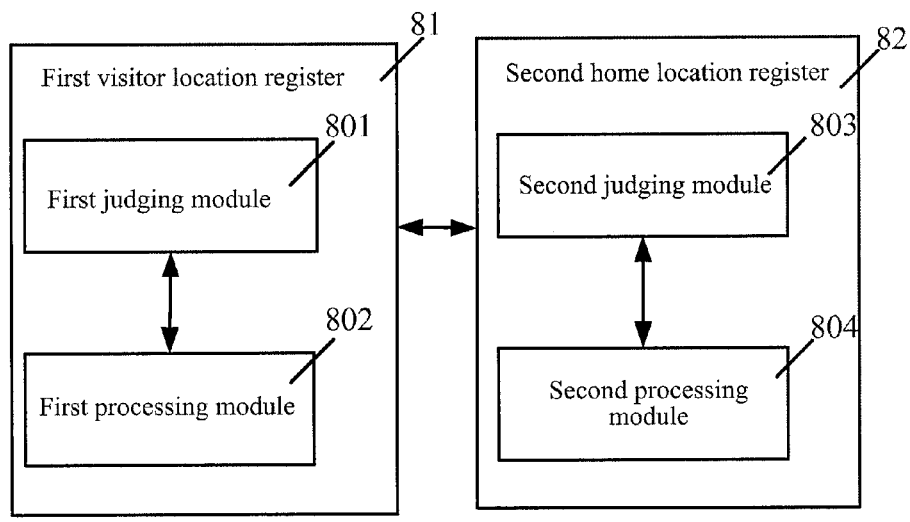
FIG. 8 is a block diagram of the implementing system for terminal communication according to an example of the present invention.

As shown in FIG. 8, the implementing system for terminal communication according to the example of the present invention comprises: a first visitor location register 81, which comprises:

a first judging module 801, which is used judge, according to an identifier of a first terminal which initiates a communication, whether the first terminal has registered first real name system information in a network, wherein, the first visitor location register is the location register which is currently visited by the first terminal, the communication is initiated by the first terminal to a second terminal, the first real name system information includes the identifier of the first terminal and subscriber identity information of the first terminal, and the subscriber identity information corresponds to the identifier of the first terminal;

a first processing module 802, which is used to, in a case when the first judging module 801 determines that the first terminal has not registered the first real name system information in the network, terminate the communication initiated by the first terminal.

Further, the system may further comprise a second home location register 82, which comprises:

a second judging module 803, which is used to judge, according to an identifier of the second terminal, whether the second terminal has registered second real name system information in the network, wherein, the second real name system information comprises the identifier of the second terminal and subscriber identity information of the second terminal; the second judging module 803 can receive the identifier of the second terminal sent by a first mobile switching center, a gateway mobile switching center or other related communication network elements (depending on different services practically implemented by the terminal, the second home location register 82 is informed of the identifier of the second terminal by different network elements, and the specific informing manners may be the commonly used manners in the prior art, and will not be listed here);

a second processing module 804, which is used to allow, in a case when the judging result of the second judging module 803 is "yes", the second terminal to accept the communication initiated by the first terminal; and to prohibit the second terminal from accepting the communication initiated by the first terminal in a case where the judging result of the second judging module 803 is "no".

The above system according to the present invention can also implement the processing as shown in FIG. 1 to FIG. 7, and the specific process thereof has been described above and thus will not be repeated here.

In addition, although "home location register" and "visitor location register" are used to describe the system, it should be noted that "home" and "visitor" are only relative concepts in specific scenes, and in practical applications, each location register should have the above first judging module, the second judging module, the first processing module and the second processing module, to thereby implement the corresponding functions.

In conclusion, through the above technical scheme of the present invention, communication management based on the real name system can be realized without significant change of the network, the terminal subscriber must be present in the mobile communication with a real identity, and the subscriber information can be determined definitely even if the terminal transmits illegal and ill contents, which helps related departments to trace the resource and dissemination status of the short message. Compared with the measures in the related technology such as shielding key words, restricting the number of sent short messages and so on, the present technical scheme purifies the network environment more effectively, facilitates high management and monitoring of the network, avoids unnecessary network overhead, and eradicates the malicious and harmful short messages that endangers society; in addition, the adopted managing manner based on real name system helps to provide targeted services for real name system mobile phone subscribers.

The above examples are only preferred examples of the present invention, and are not used to limit the present invention, any modifications, equivalent substitutions, improvements and so on made within the spirit and principle of the present invention shall fall into the protection scope of the present invention.

What is claimed is:

1. An implementing method for terminal communication, which is used for realizing communication between terminals based on a terminal real name system, wherein the method comprises:

a first visitor location register judging, according to an identifier of a first terminal which initiates a communication, whether the first terminal has registered first real name system information in a network, wherein, the first visitor location register is a location register which is currently visited by the first terminal, the communication is initiated by the first terminal to a second terminal, the first real name system information comprises the identifier of the first terminal and subscriber identity information of the first terminal, and the subscriber identity information corresponds to the identifier of the first terminal;

in a case when the first visitor location register determines that the first terminal has not registered the first real name system information in the network, terminating the communication initiated by the first terminal;

when the first terminal performs location update in advance, the first visitor location register and a first home location register storing the identifier of the first terminal and first confirmation information, wherein the first home location register is the location register to which the first terminal belongs, and the first confirmation information is used to indicate whether the first terminal has registered the first real name system information in the network.

2. The implementation method according to claim 1, wherein, in a case when the first visitor location register determines that the first terminal has registered the first real name system information, the method further comprises:

a second home location register to which the second terminal belongs judging, according to an identifier of the second terminal, whether the second terminal has registered second real name system information in the network, and allowing, when a judging result is "yes", the second terminal to accept the communication initiated by the first terminal, otherwise, prohibiting the second terminal from accepting the communication initiated by the first terminal, wherein the second real name system information comprises the identifier of the second terminal and subscriber identity information of the second terminal.

3. The implementation method according to claim 1, wherein, the operation of the first terminal performing location update comprises:

the first terminal sending a location update request to a first mobile switching center, wherein, the first terminal belongs to the first mobile switching center;

the first mobile switching center informing the first home location register of the identifier of the first terminal and location information of the first terminal via the first visitor location register;

the first home location register informing a designated network element of the identifier of the first terminal, wherein, the designated network element is used to store real name system information registered by a terminal and a corresponding identifier of the terminal;

the first home location register receiving and storing the first confirmation information returned by the designated network element, and sending the first confirmation information to the first visitor location register.

4. The implementation method according to claim 2, wherein, the method further comprises:

when the second terminal performs location update in advance, a second visitor location register that is currently visited by the second terminal and the second home location register storing the identifier of the second terminal and second confirmation information, wherein the second confirmation information is used to indicate whether the second terminal has registered the second real name system information in the network.

5. The implementation method according to claim 4, wherein, the operation of the second terminal performing location update comprises:

the second terminal sending a location update request to a second mobile switching center, wherein, the second terminal belongs to the second mobile switching center;

the second mobile switching center informing the second home location register of the identifier of the second terminal and location information of the second terminal via the second visitor location register;

the second home location register informing a designated network element of the identifier of the second terminal, wherein, the designated network element is used to store real name system information registered by a terminal and corresponding identifier of the terminal;

the second home location register receiving and storing the second confirmation information returned by the designated network element, and sending the second confirmation information to the second visitor location register.

6. The implementation method according to claim 1, wherein, in a case when the communication initiated by the first terminal is a short-message communication, the step of the first terminal initiating the communication comprises:

the first terminal sending a short message to the first mobile switching center, the first mobile switching center informing the first visitor location register of the identifier of the first terminal, and the first terminal belonging to the first mobile switching center.

7. The implementation method according to claim 6, wherein, in a case when the first visitor location register does not terminate the communication initiated by the first terminal, the method further comprises:

the first mobile switching center performing number analysis on an address of a short message center in the short message, finding an access mobile switching center of the short message center, sending the short message to the access mobile switching center, and the access mobile switching center forwarding the short message to the short message center;

a short message verifying center verifying the short message received by the short message center, and in a case when the short message passes the verification, the short message center caching the verified short message in the short message center;

the short message center forwarding the verified short message to the access mobile switching center, and the access mobile switching center finding out the second mobile switching center through the second home location register and forwarding the short message to the second mobile switching center, and then the second mobile switching center forwarding the short message to the second terminal, wherein, the second terminal belongs to the second mobile switching center.

8. The implementation method according to claim 7, wherein, before the step of the access mobile switching center sending the short message to the second mobile switching center, the method further comprises:

the access mobile switching center informing the second home location register of the identifier of the second terminal;

the second home location register judging whether the second terminal has registered the second real name system information, and in a case where the judging result is "yes", allowing the access mobile switching center to send the short message to the second terminal via the second mobile switching center.

9. An implementing method for terminal communication, which is used for realizing communication between terminals based on a terminal real name system, and wherein the method comprises:

in a case when a first terminal initiates a communication to a second terminal, a second home location register to which the second terminal belongs judging, according to an identifier of the second terminal, whether the second terminal has registered second real name system information in a network, wherein, the second real name system information comprises the identifier of the second terminal and subscriber identity information of the second terminal, and the subscriber identity information corresponds to the identifier of the second terminal;

if the second terminal has not registered the second real name system information, prohibiting the second terminal from accepting the communication initiated by the first terminal;

when the second terminal performs location update in advance, a second visitor location register that is currently visited by the second terminal and the second home location register storing the identifier of the second terminal and second confirmation information, wherein the second confirmation information is used to indicate whether the second terminal has registered the second real name system information in the network.

10. The implementation method according to claim 9, wherein, the step of the second terminal performing location update comprises:

the second terminal sending a location update request to a second mobile switching center, wherein, the second terminal belongs to the second mobile switching center;

the second mobile switching center informing the second home location register of the identifier of the second terminal and location information of the second terminal via the second visitor location register;

the second home location register informing a designated network element of the identifier of the second terminal, wherein, the designated network element is used to store real name system information registered by a terminal and a corresponding identifier of the terminal;

the second home location register receiving and storing the second confirmation information returned by the designated network element, and sending the second confirmation information to the second visitor location register.

11. An implementing system for terminal communication, which is used for realizing communication between terminals based on a terminal real name system, wherein, the system comprises a first visitor location register and a first home location register, and the first visitor location register comprises:

a first judging module, which is used to judge, according to an identifier of a first terminal which initiates a communication, whether the first terminal has registered first real name system information in a network, wherein, the first visitor location register is a location register which is currently visited by the first terminal, the communication is initiated by the first terminal to a second terminal, the first real name system information includes the identifier of the first terminal and subscriber identity information of the first terminal, and the subscriber identity information corresponds to the identifier of the first terminal;

a first processing module, which is used to, in a case when the first judging module determines that the first terminal has not registered the first real name system information in the network, terminate the communication initiated by the first terminal;

a first storage module, which is used to, when the first terminal performs location update in advance, store the identifier of the first terminal and first confirmation information;

the first home location register comprises a second storage module, which is used to, when the first terminal performs location update in advance, store the identifier of the first terminal and first confirmation information, wherein the first home location register is the location register to which the first terminal belongs, and the first confirmation information is used to indicate whether the first terminal has registered the first real name system information in the network.

12. The implementation system according to claim 11, wherein, the system further comprises a second home location register, which comprises:

a second judging module, which is used to, in a case when the first processing module does not terminate the communication initiated by the first terminal, judge whether the second terminal has registered second real name system information in the network according to an identifier of the second terminal, wherein, the second real name system information comprises the identifier of the second terminal and subscriber identity information of the second terminal;

a second processing module, which is used to allow the second terminal to accept the communication initiated by the first terminal in a case when a judging result of the second judging module is "yes", and to prohibit the second terminal from accepting the communication initiated by the first terminal in a case when the judging result of the second judging module is "no";

a third storage module, which is used to, when the second terminal performs location update in advance, store the identifier of the second terminal and second confirmation information, wherein the second confirmation information is used to indicate whether the second terminal has registered the second real name system information in the network.

13. The implementation method according to claim 2, wherein, in a case when the communication initiated by the first terminal is a short-message communication, the step of the first terminal initiating the communication comprises:

the first terminal sending a short message to the first mobile switching center, the first mobile switching center informing the first visitor location register of the identifier of the first terminal, and the first terminal belonging to the first mobile switching center.

14. The implementation method according to claim 13, wherein, in a case when the first visitor location register does not terminate the communication initiated by the first terminal, the method further comprises:

the first mobile switching center performing number analysis on an address of a short message center in the short message, finding an access mobile switching center of the short message center, sending the short message to the access mobile switching center, and the access mobile switching center forwarding the short message to the short message center;

a short message verifying center verifying the short message received by the short message center, and in a case when the short message passes the verification, the short message center caching the verified short message in the short message center;

the short message center forwarding the verified short message to the access mobile switching center, and the access mobile switching center finding out the second mobile switching center through the second home location register and forwarding the short message to the second mobile switching center, and then the second mobile switching center forwarding the short message to the second terminal, wherein, the second terminal belongs to the second mobile switching center.

15. The implementation method according to claim 14, wherein, before the step of the access mobile switching center sending the short message to the second mobile switching center, the method further comprises:

the access mobile switching center informing the second home location register of the identifier of the second terminal;

the second home location register judging whether the second terminal has registered the second real name system information, and in a case where the judging result is "yes", allowing the access mobile switching center to send the short message to the second terminal via the second mobile switching center.

* * * * *